United States Patent
Nomura et al.

(10) Patent No.: US 6,659,063 B2
(45) Date of Patent: Dec. 9, 2003

(54) PISTON FOR INTERNAL COMBUSTION ENGINE

(75) Inventors: Akifumi Nomura, Saitama (JP); Yasuo Shimura, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/124,345

(22) Filed: Apr. 18, 2002

(65) Prior Publication Data

US 2002/0178909 A1 Dec. 5, 2002

(30) Foreign Application Priority Data

Apr. 30, 2001 (JP) .......................... 2001-170268

(51) Int. Cl.[7] .................. F02F 3/22; F01P 3/06; F16J 1/09
(52) U.S. Cl. .................................................. 123/193.6
(58) Field of Search ................. 123/193.6; 92/187–208

(56) References Cited

U.S. PATENT DOCUMENTS 5,074,264 A * 12/1991 Mielke ..................... 123/193.6
5,076,225 A * 12/1991 Tokoro et al. .............. 123/193.6
5,839,407 A * 11/1998 Suzuki et al. .................. 92/187
6,240,828 B1 * 6/2001 Fujimoto ........................ 92/214
6,260,472 B1 * 7/2001 Zhu et al. ....................... 92/214
6,357,341 B1 * 3/2002 Watanabe et al. .......... 123/193.6

FOREIGN PATENT DOCUMENTS

JP          7-7570          2/1995

* cited by examiner

Primary Examiner—Marguerite McMahon
(74) Attorney, Agent, or Firm—Birch, Stewart, Kolasch & Birch, LLP

(57) ABSTRACT

To lighten and miniaturize a piston and form a piston for a high-speed revolution. A top ring groove and an oil ring groove are formed on the periphery of a crown and a lubricator is provided inside the oil ring groove. A pair of piston pin bosses are provided continuously under the crown in opposite positions and a skirt is provided apart by 90°. The lower end of the skirt is located on the upside of the lower end of the piston pin boss and a lubricator is provided in an upper part of the skirt, under and in the vicinity of the oil ring groove.

18 Claims, 6 Drawing Sheets

PISTON FOR INTERNAL COMBUSTION ENGINE

BACKGROUND OF THE INVENTION

Cross-Reference to Related Applications

The present application claims priority under 35 USC 119 to Japanese Patent Application No. 2001-170268 filed on Apr. 30, 2001 the entire contents thereof is hereby incorporated by reference.

1. Field of the Invention

The present invention relates to a piston for an internal combustion engine. More particularly to a piston for an internal combustion engine suitable for high-speed revolution and miniaturization.

2. Description of Background Art

A conventional type piston provided with a crown, a piston pin boss integrated with the crown and a pair of skirts opposed includes a groove for a piston ring that is provided on the periphery of the crown is disclosed in Japanese Utility Model Publication No. Hei 7-7570. FIG. 6 shows such conventional type structure, a top ring groove 2, a second ring groove 3 and an oil ring groove 4 are provided on the periphery of a crown 1 and a piston ring not shown is fitted into each groove. A lubricator 5 that pierces the crown is formed at the bottom of the oil ring groove 4.

A piston pin boss 6 is provided having a skirt 7 with a lower end of the skirt 7 extending downwardly a greater distance relative to the lower end of the piston pin boss 6 and a part having a difference in a level 8 for a machining datum is formed.

In this disclosure, the upside and the downside of the piston are based upon states shown in FIGS. 6, 1, 3 and 4, and the upside, the downside, the right and the left in each drawing are equivalent to those of a product or a part equivalent to an embodiment.

As the weight is increased by the quantity when a lower part of the skirt 7 protrudes a longer distance downwardly as in the conventional type, the high-speed revolution and the miniaturization of an engine may be impaired. In case where the circumferential width of the skirt is large, a similar problem also occurs.

Also, in the case when lubrication is not enough even if a lubricator is provided at the bottom of the oil ring groove, the contact of the piston with a cylinder becomes strong, and scratching by the piston and seizure may occur.

Further, the part having a difference in a level 8 for a machining datum is provided in the lower part of the skirt 7. However, the part having a difference in a level 8 may cause a crack due to stress concentration under a condition in which the skirt 7 applies a large load. An object of the present invention is to provide a piston in which the above-mentioned problems are solved.

SUMMARY AND OBJECTS OF THE INVENTION

To solve the above problems, a piston for an internal combustion engine according to the present invention discloses a piston for an internal combustion engine provided with a crown, a pair of piston pin bosses respectively integrated with the crown and opposed and a pair of skirts respectively integrated with the crown and opposed thereto wherein the lower end of the skirt is located on the upside of the lower end of the piston pin boss.

The present invention includes a circumferential width of the skirt that is equivalent to 40% or less of the diameter of the piston.

The present invention includes first lubricators for piercing the crown from an oil ring groove provided on the circumferential side of the crown and second lubricators for piercing the skirt under the oil ring groove.

The present invention includes a part having a difference in a level for a machining datum that is removed from the lower end of the skirt.

According to the present invention, as the lower end of the skirt is located on the upside of the lower end of the piston pin boss, the area of the skirt can be minimized, as a result, as an increase in the weight by the skirt is prevented and lightening is possibly realized, an engine can be revolved at high speed and can be miniaturized. Each lower end of the skirt and the piston pin boss means the farthest part from the crown in the axial direction of the piston.

According to the present invention, as the ratio of the circumferential width of the skirt to the diameter of the piston is 40% or less, the area of the skirt can be minimized and the lightening and miniaturization are enabled.

According to the present invention, as the lubricator is provided under the oil ring groove, the skirt can be sufficiently lubricated. Therefore, the lubrication of the skirt can be stabilized.

According to the present invention, as the part having a difference in a level for a machining datum is cut from the lower end of the skirt, stress concentration under a condition in which a large load is applied is solved and the specification in which a crack is hardly caused can be set.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
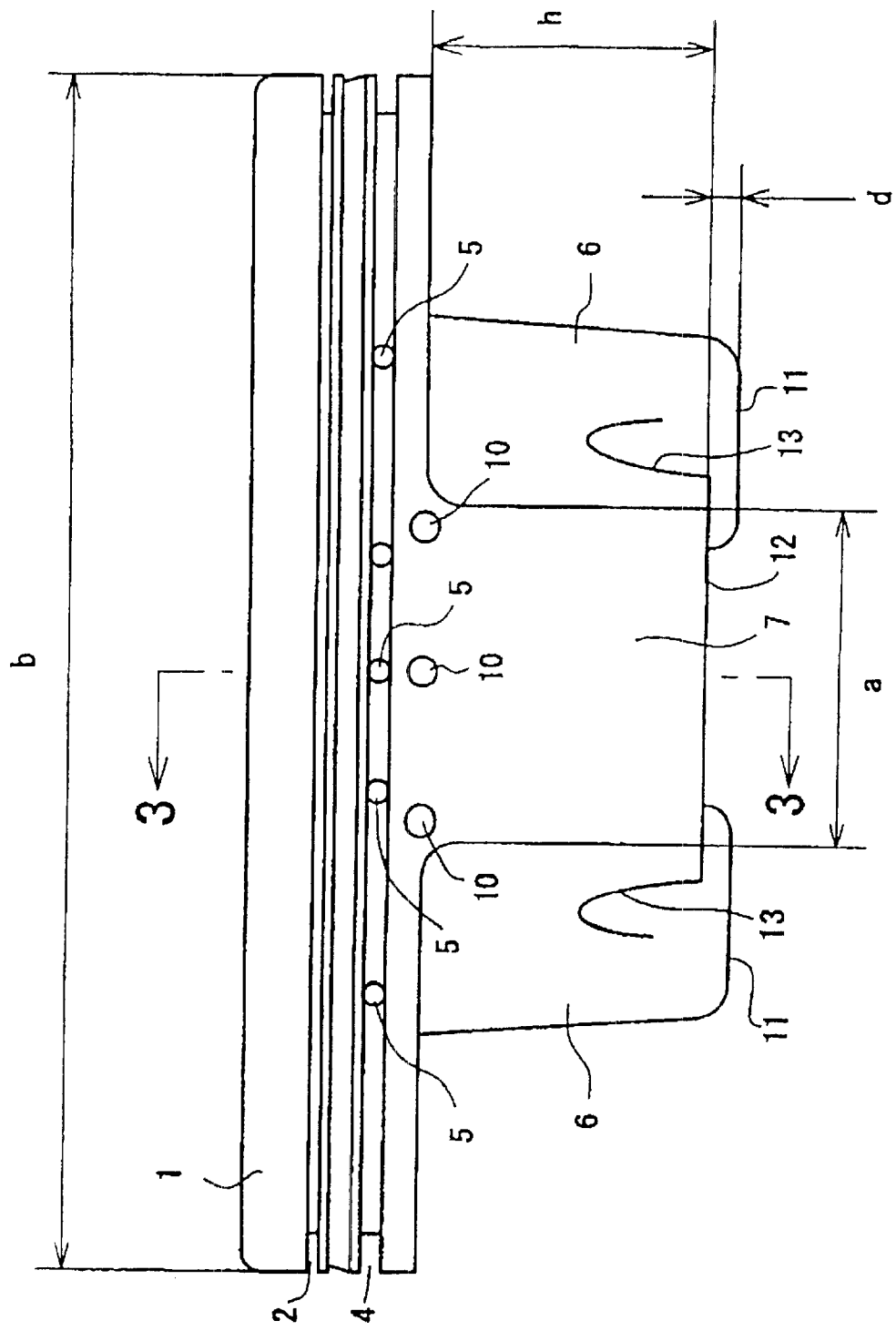
FIG. 1 is a front view showing a piston equivalent to this embodiment.

As shown in FIG. 1, a top ring groove 2 and an oil ring groove 4 under the top ring groove are formed on the side of a crown 1. Lubricators 5 are formed at the bottom of the oil ring groove 4 at a suitable interval piercing the crown and oil is supplied from the inside of the piston to the side of the surface via the lubricators 5. Each one pair of a piston pin boss 6 and a skirt 7 are formed apart by 90° under the crown 1.

Plural lubricators 10 are formed at a predetermined interval in a peripheral direction in the vicinity of the oil ring groove 4 in an upper part of the skirt 7. In this embodiment, three pieces having a larger hole diameter than the hole diameter of the lubricator 5 are formed per each skirt 7. The degree of the freedom of the hole diameter of the lubricator 10 is increased when the lubricator is provided to the skirt 7. The lubricator 5 is provided in the vicinity of the opposite skirt 7 and in this embodiment, four pieces are formed per one side.

The ratio of the width a in the peripheral direction of the skirt 7 to the diameter b of the crown 1, a/b is 40% or less. The circumferential width of the skirt 7 means the circumferential width of the crown 1 on a plane of projection opposite to the skirt 7 at the front (that is, the skirt 7 shown in FIG. 1).

Figure 2:
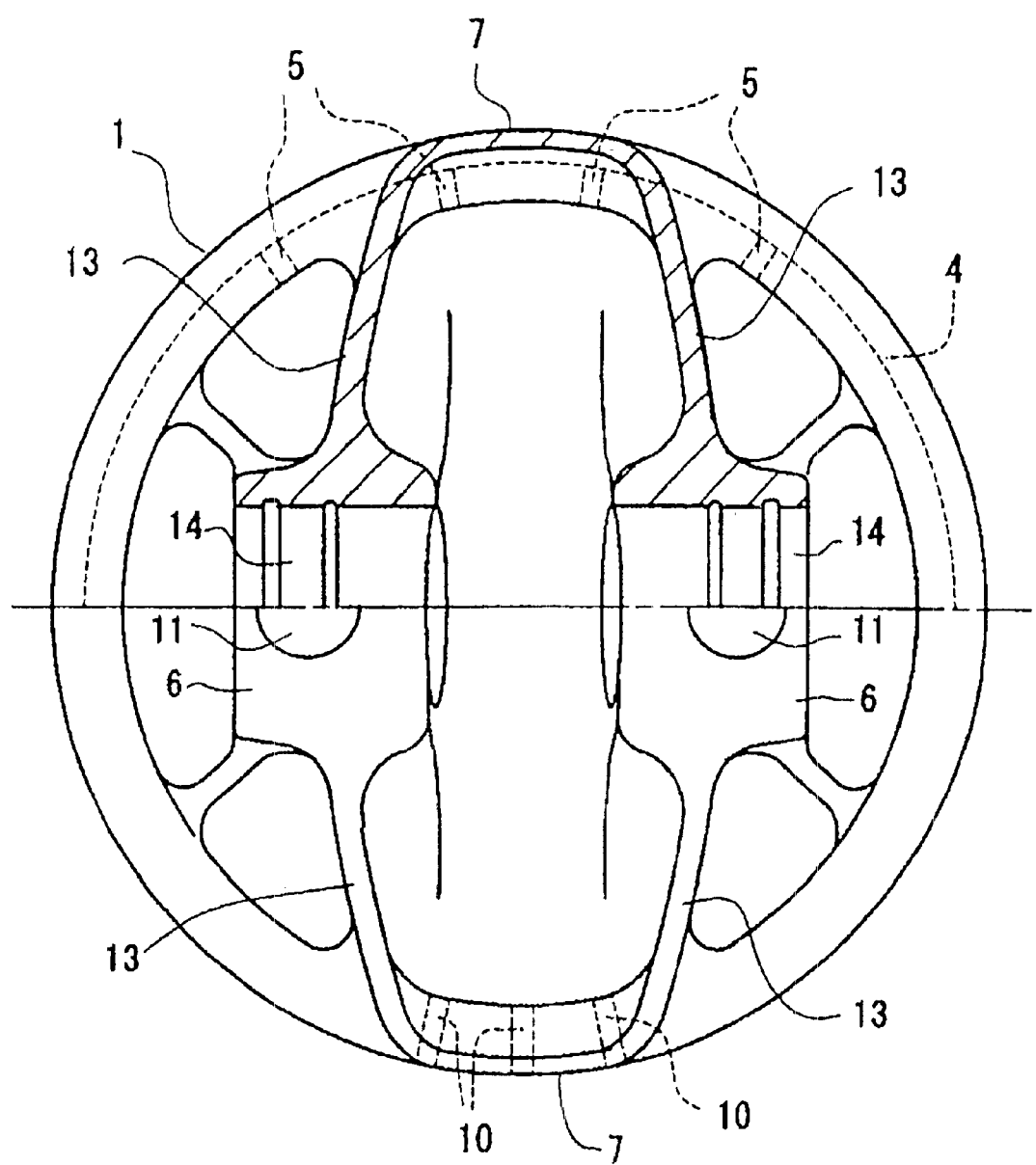
FIG. 2 is a bottom view showing the piston.

As shown in FIGS. 1 and 2, the skirt 7 is formed in positions to be the intake side and the exhaust side apart by 180° in relatively narrow width (a) and the contact surface with a cylinder forms an arc concentric with the periphery of the crown 1. However, as illustrated in FIG. 2, the lower end 12 of the skirt 7 continues to an arcing part 13 continuing to the arcing piston pin boss 6 located apart by 90°, and the lower end 12, the arcing part 13 and the piston pin boss 6 substantially form an ellipse when they are viewed from the bottom.

The piston pin boss 6 is integrated with the arcing part 13, is formed so that it is thick so as to bear a piston pin not shown and a pin hole 14 for inserting the piston pin is formed. In this embodiment, a normal layout that the center of the arcing part 13 coincides with the center of the crown 1 is adopted.

Figure 3:
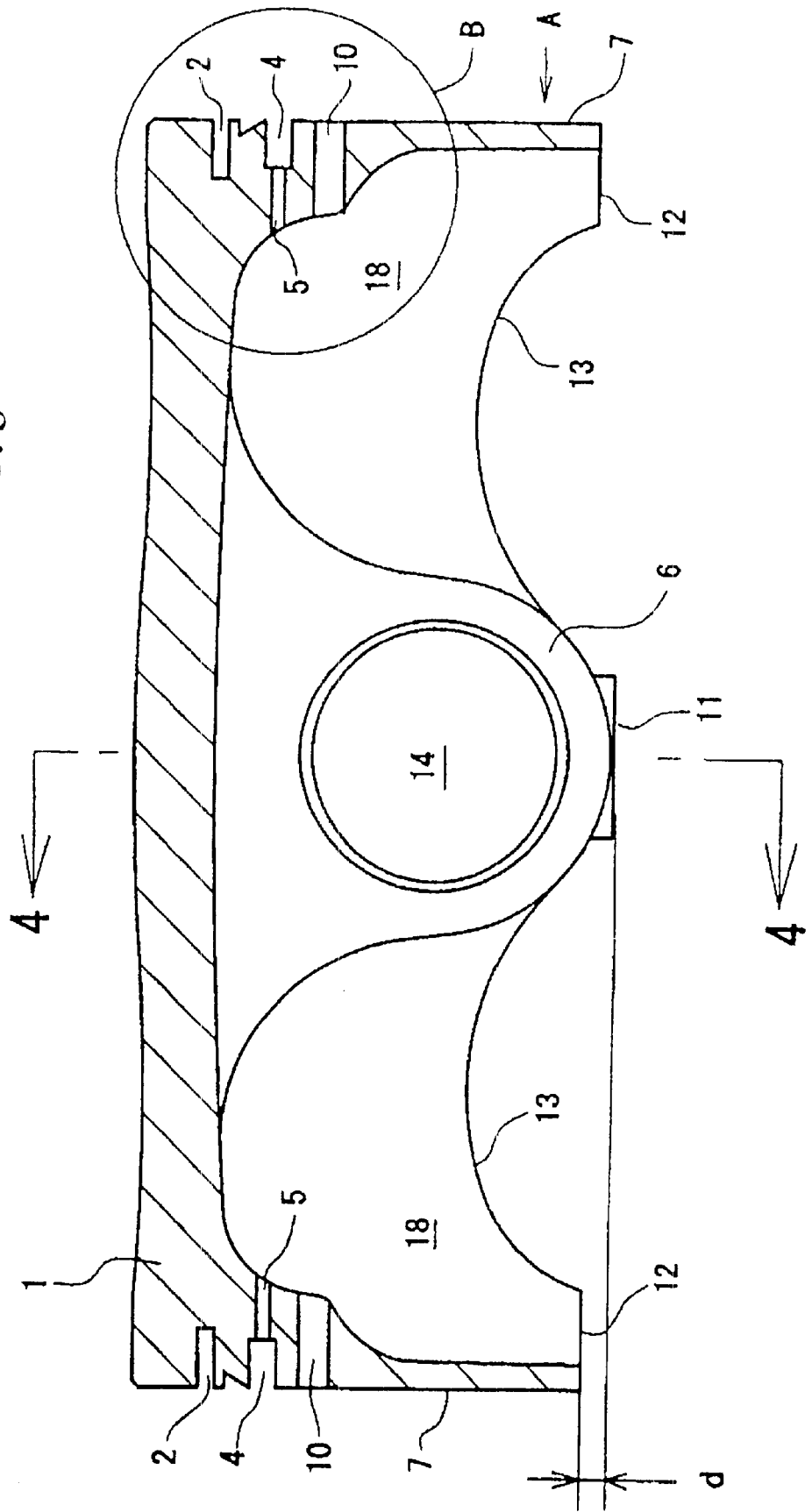
FIG. 3 is a sectional view viewed from a direction shown by an arrow 3—3 in FIG. 1.

For the lower end 11 of the piston pin boss 6 and the lower end 12 of the skirt 7, as is clear from FIGS. 1 and 3, the quantity protruding downwardly from the skirt is reduced so that the lower end 12 of the skirt 7 is located on the upside of the lower end 11 of the piston pin boss 6 by a dimension d. A value of the dimension d is arbitrarily set in a range in which no swing of the skirt 7 is caused and the lower end 12 of the skirt 7 is located on the upside of the lower end 11 of the piston pin boss 6.

Figure 6:
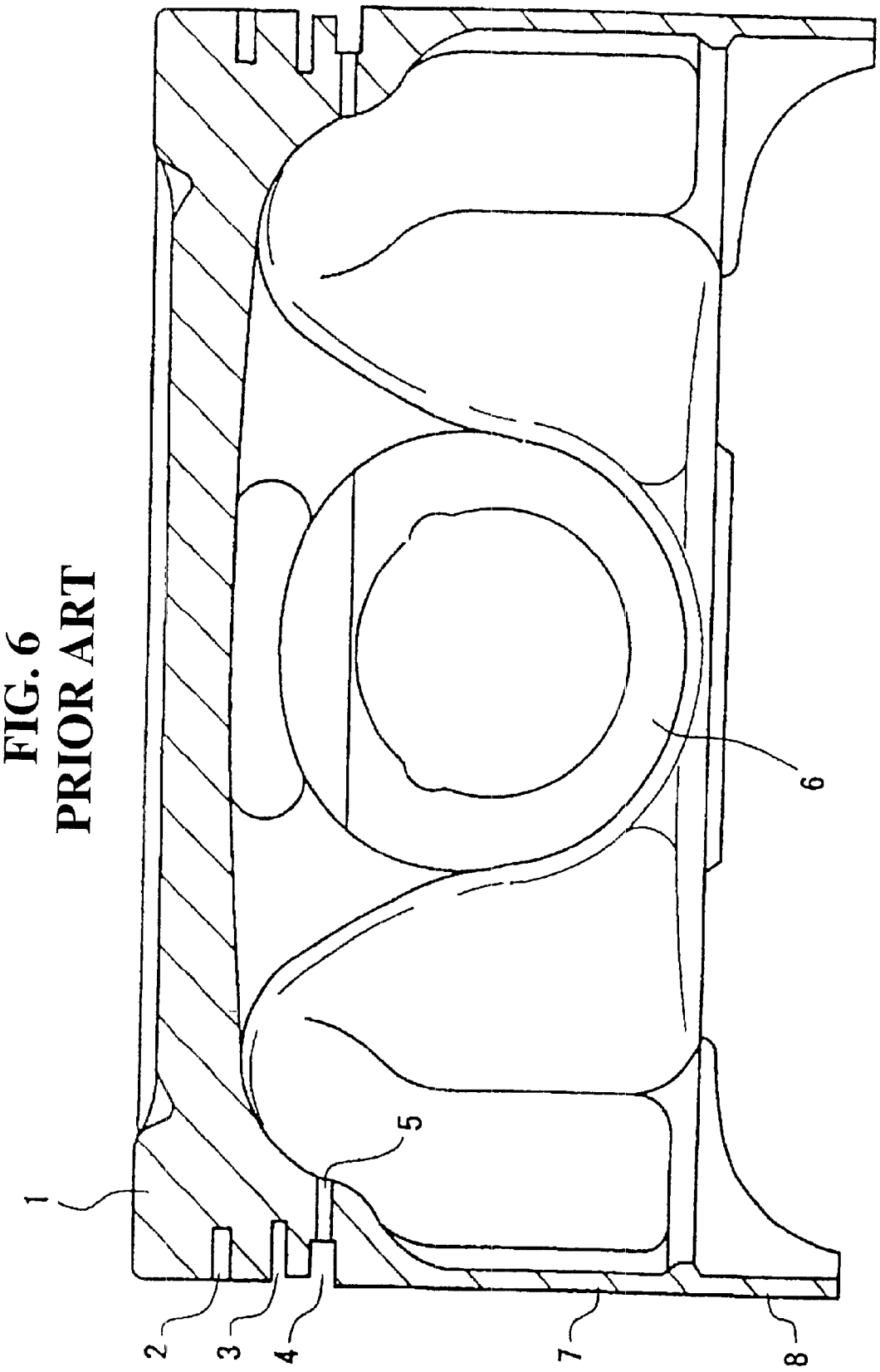
FIG. 6 is a sectional view equivalent to FIG. 3 showing a conventional type.

The lower end 12 of the skirt 7 extends downwardly a longer distance relative to the lower end 11 of the piston pin boss 6 as in the conventional type shown in FIG. 6 and a part having a difference in a level 8 (shown in FIG. 6) is also formed in an initial forming step. However, finally, the part having difference in a level 8 is also simultaneously removed by cutting a part lower than the lower end 11 of the piston pin boss 6.

Figure 4:
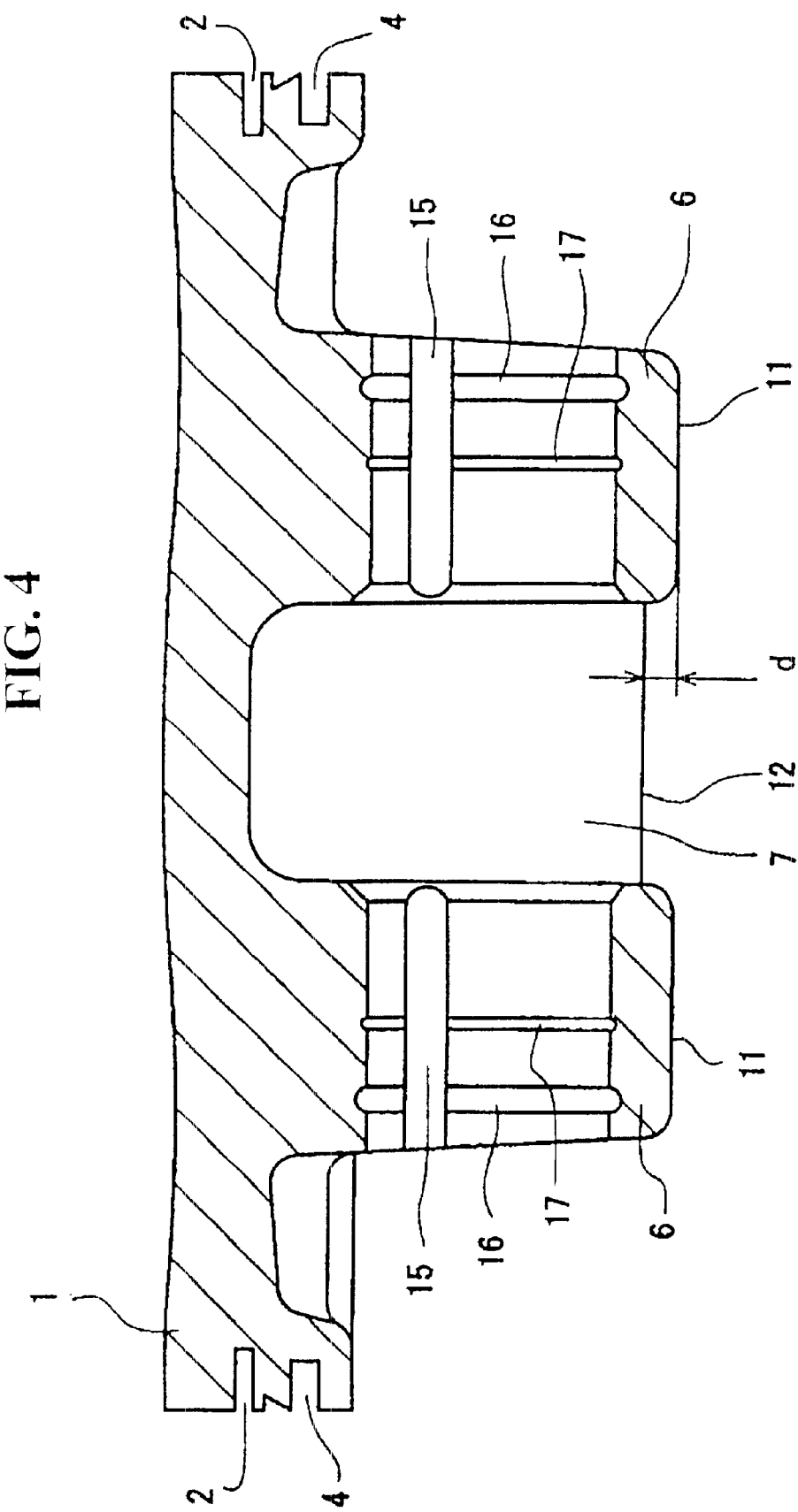
FIG. 4 is a sectional view viewed from a direction shown by an arrow 4—4 in FIG. 3.

FIG. 4 shows the structure of the piston pin boss 6, the piston pin boss 6 is formed in a position drawn inside the crown 1 and grooves 15, 16 and 17 for lubrication and others are formed in the pin hole 14.

Figure 5:
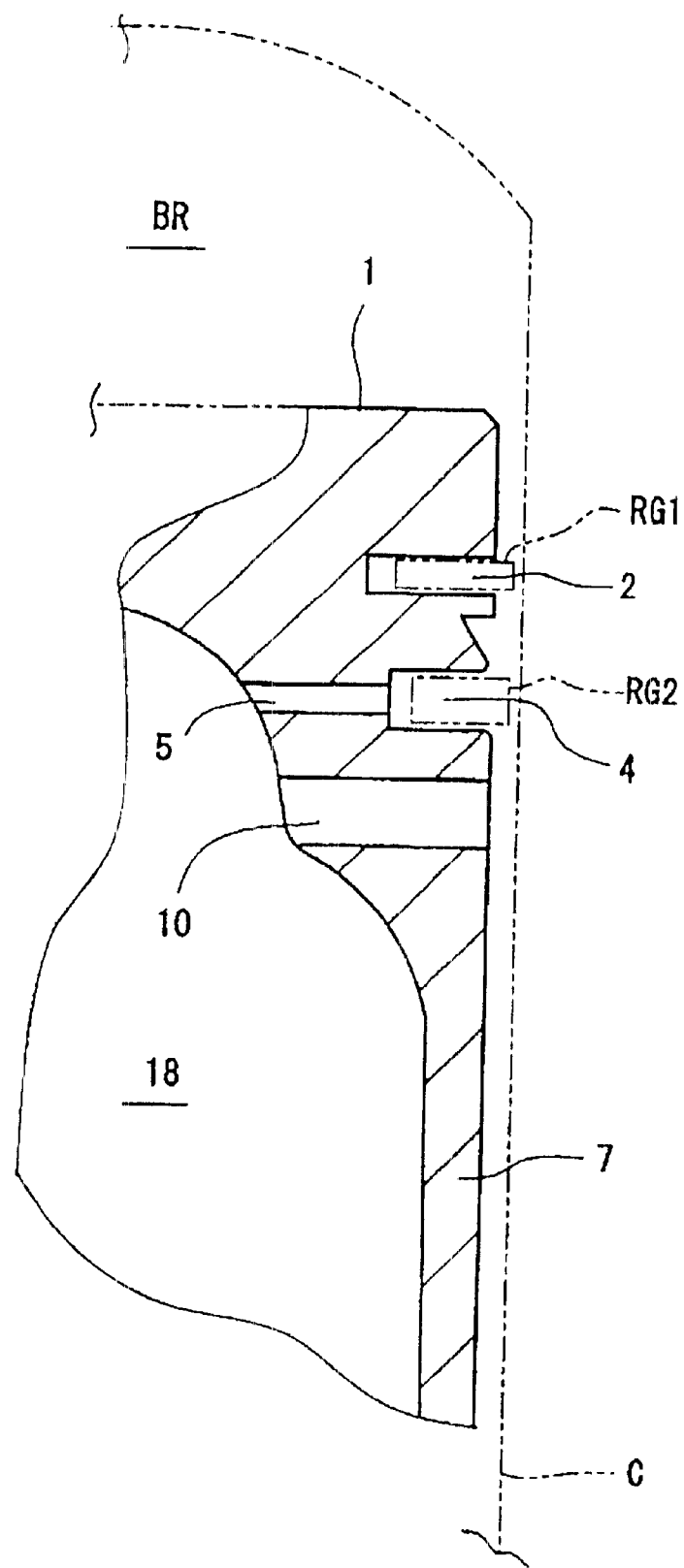
FIG. 5 is an enlarged view showing a part B in FIG. 3.

As shown in FIG. 5, plural lubricators 10 are circumferentially formed in the vicinity of a boundary between the crown 1 and the skirt 7 at a suitable interval, communicate with space 18 inside the skirt 7, oil supplied into the space 18 from the side of a crankshaft not shown is led to the outer surface of the skirt 7 and lubricates between the skirt 7 and the inner surface of a cylinder C. This lubrication is added to lubrication from the lubricator 5. A reference code BR in FIG. 5 denotes a combustion chamber, C denotes a cylinder, RG1 denotes a top ring and RG2 denotes an oil ring.

Next, the action of this embodiment will be described. As shown in FIGS. 1 and 3, as the lower end 12 of the skirt 7 is located on the upside of the lower end 11 of the piston pin boss 6 by the dimension d, the lower end 12 of the skirt 7 never protrudes downwardly from the lower end 11 of the piston pin boss 6 and as the vertical width h of the skirt 7 is shortened by this quantity, the skirt 7 can be miniaturized and lightened and a structure suitable for high-speed revolution is acquired.

In addition, as the ratio of the diameter b of the crown 1 to the circumferential width a of the skirt 7, a/b is 40% or less, a slid area between the skirt 7 and the inner surface of the cylinder C can be also possibly be reduced, thereby and the piston can be miniaturized and be constructed of a lighter weight.

Also, as the part having a difference in a level 8 shown in FIG. 6 made in the initial forming step is removed from the lower end 12 of the skirt 7, a crack can be prevented from being made by the part having a difference in a level 8. Therefore, the piston becomes suitable for use in a high-speed revolution that may cause a heavily loaded state in which a crack is caused.

Further, as is clear from FIG. 5, as the lubricator 10 is provided under the oil ring groove 4, the oil ring scrapes oil that adheres to the inner wall of the cylinder C when the piston is reciprocated in the cylinder C and oil is supplied between the skirt 7 and the cylinder C from the lubricators 5 and 10.

At this time, as the lubricator 10 is located under the oil ring groove 4 and is always open, oil of sufficient quantity can be supplied from the lubricator 10 even if lubrication is not necessarily enough by only the lubricator 5 in a high-speed revolution, a conventional type lubrication by the lubricator 5 is complemented and particularly, lubrication in a high-speed revolution becomes satisfactory.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A piston for an internal combustion engine provided with a crown, a pair of piston pin bosses respectively integrated with the crown and respectively opposed and a pair of skins respectively integrated with the crown and respectively opposed, wherein:

a lower end of the pair of skins extends downwardly from said crown a shorter distance relative to a lower end of the pair of piston pin bosses and a circumferential width of each skirt is equivalent to 40% or less of a diameter of the piston.

2. The piston for an internal combustion engine according to claim 1, and further including a first lubricator for piercing the crown from an oil ring groove provided on the circumferential side of the crown and a second lubricator for piercing the skirt under the oil ring groove.

3. The piston for an internal combustion engine according to claim 1, wherein a portion having a difference in a level for a machining datum is removed from the lower end of the skirt.

4. The piston for an internal combustion engine according to claim 2, wherein said first lubricator includes a plurality of openings spaced a predetermined distance apart and formed at a bottom portion of the oil ring groove for supplying lubrication to said piston.

5. The piston for an internal combustion engine according to claim 2, wherein said second lubricator includes a plurality of openings spaced a predetermined distance apart and formed in a peripheral direction at an upper portion of the skirt.

6. The piston for an internal combustion engine according to claim 2, wherein the second lubricator supplies a larger quantity of lubricant relative to the lubricant supplied by the first lubricator.

7. The piston for an internal combustion engine according to claim 1, wherein said pair of skirts includes a first portion corresponding with an intake side and a second portion corresponding with an exhaust side, said first and second portions being spaced approximately 180° relative to each other.

8. The piston for an internal combustion engine according to claim 7, wherein the first portion and said second portion form an arc concentric with a periphery of the crown, said arc being substantially elliptical in shape.

9. The piston for an internal combustion engine according to claim 8, wherein said pair of piston pin bosses is integrated with a central arcing portion of said first and second portions of said skirt for inserting a piston pin therein.

10. A piston for an internal combustion engine comprising:
   a crown;
   a pair of piston pin bosses respectively integrated with the crown and respectively opposed with respect to each other, said pair of piston pin bosses including a lower end extending downwardly a first predetermined distance relative to said crown; and
   a pair of skirts respectively integrated with the crown and respectively opposed with respect to each other, said pair of skirts including a lower end extending downwardly a second predetermined distance relative to said crown and a circumferential width of each skirt is equivalent to 40% or less of a diameter of the piston;
   wherein said first predetermined distance that the lower end of said pair of piston pin bosses extends from said crown is greater relative to the second predetermined distance that the lower end of the pair of skirts extends from said crown.

11. The piston for an internal combustion engine according to claim 10, and further including a first lubricator for piercing the crown from an oil ring groove provided on the circumferential side of the crown and a second lubricator for piercing the skirt under the oil ring groove.

12. The piston for an internal combustion engine according to claim 10, wherein claim a portion having a difference in a level for a machining datum is removed from the lower end of the skirt.

13. The piston for an internal combustion engine according to claim 11, wherein said first lubricator includes a plurality of openings spaced a predetermined distance apart and formed at a bottom portion of the oil ring groove for supplying lubrication to said piston.

14. The piston for an internal combustion engine according to claim 11, wherein said second lubricator includes a plurality of openings spaced a predetermined distance apart and formed in a peripheral direction at an upper portion of the skirt.

15. The piston for an internal combustion engine according to claim 11, wherein the second lubricator supplies a larger quantity of lubricant relative to the lubricant supplied by the first lubricator.

16. The piston for an internal combustion engine according to claim 10, wherein said pair of skirts includes a first portion corresponding with an intake side and a second portion corresponding with an exhaust side, said first and second portions being spaced approximately 180° relative to each other.

17. The piston for an internal combustion engine according to claim 16, wherein the first portion and said second portion form an arc concentric with a periphery of the crown, said arc being substantially elliptical in shape.

18. The piston for an internal combustion engine according to claim 17, wherein said pair of piston pin bosses is integrated with a central arcing portion of said first and second portions of said skirt for inserting a piston pin therein.

* * * * *